United States Patent
Feng

(10) Patent No.: US 12,158,777 B2
(45) Date of Patent: Dec. 3, 2024

(54) DISPLAY DEVICE HAVING SLIDING ASSEMBLY

(71) Applicant: WUHAN CHINA STAR OPTOELECTRONICS SEMICONDUCTOR DISPLAY TECHNOLOGY CO., LTD., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 694 days.

(21) Appl. No.: 16/958,740

(22) PCT Filed: Apr. 16, 2020

(86) PCT No.: PCT/CN2020/085020
§ 371 (c)(1),
(2) Date: Jun. 29, 2020

(87) PCT Pub. No.: WO2021/155640
PCT Pub. Date: Aug. 12, 2021

(65) Prior Publication Data
US 2023/0109963 A1    Apr. 13, 2023

(30) Foreign Application Priority Data
Feb. 7, 2020    (CN) .......................... 202010082586.6

(51) Int. Cl.
*G06F 1/16*    (2006.01)

(52) U.S. Cl.
CPC .................................. *G06F 1/1652* (2013.01)

(58) Field of Classification Search
CPC ...... G06F 1/181; G06F 1/1624; G06F 1/1652; G09F 9/301; G09G 3/035
See application file for complete search history.

(56) References Cited

U.S. PATENT DOCUMENTS 10,708,395 B1 *   7/2020   Han .................... H05K 5/0217
2014/0123436 A1   5/2014   Griffin et al.
(Continued)

FOREIGN PATENT DOCUMENTS

CN    104238923 A    12/2014
CN    105489628 A    4/2016
(Continued)

OTHER PUBLICATIONS

European Office Action issued in corresponding European Patent Application No. 20737328.3 dated Jan. 31, 2024, pp. 1-7.

*Primary Examiner* — James Wu
(74) *Attorney, Agent, or Firm* — PV IP PC; Wei Te Chung

(57) ABSTRACT

The present invention provides a display device, including a flexible display assembly carried on a housing. The housing includes a first housing and a second housing. The second housing is provided with a winding assembly, a sliding assembly, and a pretension member. The present invention drives the sliding assembly to slide through a relative sliding of the first housing and the second housing. The winding assembly is used to reel in or pull out the flexible display assembly by sliding the sliding assembly, and the sliding assembly slides under driving of a pretension of a pretension member.

19 Claims, 9 Drawing Sheets

(56) References Cited

U.S. PATENT DOCUMENTS

| | | |
|---|---|---|
| 2014/0211399 A1 | 7/2014 | O'Brien |
| 2016/0035310 A1* | 2/2016 | Song ................. G06F 3/017 |
| | | 345/156 |
| 2016/0100478 A1 | 4/2016 | Lee |
| 2017/0357287 A1 | 12/2017 | Yang |
| 2018/0014417 A1 | 1/2018 | Seo et al. |
| 2019/0295403 A1 | 9/2019 | Lin et al. |
| 2019/0297175 A1 | 9/2019 | Lin et al. |
| 2020/0348726 A1 | 11/2020 | Han et al. |
| 2021/0105902 A1* | 4/2021 | Yoon ................. H05K 5/0217 |
| 2021/0181801 A1* | 6/2021 | Yin .................... H04M 1/0268 |

FOREIGN PATENT DOCUMENTS

| | | | | |
|---|---|---|---|---|
| CN | 105518767 A | | 4/2016 | |
| CN | 105518769 A | | 4/2016 | |
| CN | 106157816 A | | 11/2016 | |
| CN | 107424518 A | | 12/2017 | |
| CN | 110047384 A | * | 7/2019 | ........... G06F 1/1624 |
| CN | 110706600 A | | 1/2020 | |
| CN | 110718148 A | | 1/2020 | |
| KR | 20170116551 A | | 10/2017 | |

* cited by examiner

DISPLAY DEVICE HAVING SLIDING ASSEMBLY

FIELD OF INVENTION

The present invention relates to the field of display technologies, and in particular, to a display device.

BACKGROUND OF INVENTION

At present, organic light emitting diodes (OLEDs) have received widespread attention due to their bendability and flexibility. By folding or reeling the OLEDs, space occupied by larger screens can be reduced, and sizes of display devices can be changed to make them more portable. Therefore, folding and reeling display devices have become a main research direction of flexible OLEDs. However, current display devices that can be changed in size need to have an external force be applied to the display devices during an entire process of changing sizes to realize changes in size of the display devices. Obviously, current design cannot meet demands for automation and convenience of the display devices in the future.

Therefore, current technologies have defects and need to be solved urgently.

Technical Problem

The present invention provides a display device, which can solve problems that current display devices with variable size need to have an external force be applied to the display devices during an entire process of changing sizes, and cannot meet demands for automation and convenience of the display devices in the future.

Technical Solution

In order to solve the above problems, technical solutions provided by the present invention are as follows:

The present invention provides a display device, comprising:
 a flexible display assembly comprising a first end and a second end disposed opposite to each other; and
 a housing, wherein the flexible display assembly is carried on the housing, the housing comprises a first housing and a second housing disposed opposite to each other, the first end of the flexible display assembly is connected to the first housing, the second end is connected to the second housing, and the first housing and the second housing are configured to slide relative to each other along a first direction to increase or decrease an area of the flexible display assembly in an expanded state;
 wherein the second housing is provided with a winding assembly, a sliding assembly, and a pretension member, the second end of the flexible display assembly wound around the winding assembly is connected to the sliding assembly, and the sliding assembly is connected to the second housing through the pretension member; and
 wherein when the first housing and the second housing slide relative to each other, the winding assembly reels in the flexible display assembly or pulls out a reeled-in portion of the flexible display assembly by sliding the sliding assembly, and the pretension member comprises a pretension, and the sliding assembly is configured to be slid along the first direction in the second housing by the pretension to reel in the flexible display assembly.

In the display device of the present invention, a length of the flexible display assembly that is reeled in or pulled out by the winding assembly is equal to a sliding distance of the sliding assembly relative to the second housing, and is equal to a relative sliding distance between the first housing and the second housing.

In the display device of the present invention, a sliding direction of the sliding assembly is same as a sliding direction of the first housing.

In the display device of the present invention, the winding assembly comprises a first pulley and a second pulley disposed at two ends of the second housing, axial directions of the first pulley and the second pulley are parallel to the second housing and perpendicular to the first direction, the first pulley is disposed at an end of the second housing close to the first housing, and the second pulley is disposed at an end of the second housing away from the first housing.

In the display device of the present invention, a diameter of the second pulley is less than or equal to a thickness of the housing, and a diameter of the first pulley is less than the diameter of the second pulley.

In the display device of the present invention, a portion of the second pulley is embedded in an end of the second housing, and a remaining portion of the second pulley is exposed from a surface of the second housing and is in contact with the flexible display assembly.

In the display device of the present invention, the second housing is provided with a cavity, the sliding assembly and the pretension member are disposed in the cavity, the second housing is further provided with an opening communicating with the cavity, and the second end of the flexible display assembly extends into the cavity through the opening and is connected to the sliding assembly.

In the display device of the present invention, an inner surface of the second housing is provided with a sliding groove, an extending direction of the sliding groove is consistent with the first direction, and the sliding assembly is used to slide in the extending direction of the sliding groove.

In the display device of the present invention, the sliding assembly comprises at least two sliding blocks disposed opposite to each other and a third pulley disposed between the two sliding blocks, an axial direction of the third pulley is parallel to the second housing and perpendicular to the first direction, two ends of the third pulley are respectively fixed to the two sliding blocks disposed opposite to each other, and the second end of the flexible display assembly is connected to the third pulley.

In the display device of the present invention, the sliding assembly comprises the at least two sliding blocks disposed along the sliding groove and in contact with each other, the sliding block close to the pretension member is connected to the pretension member, and the sliding block away from the pretension member is connected to the third pulley.

In the display device of the present invention, when the first housing and the second housing slide relative to each other along the first direction to increase an area of the display device, the sliding assembly slides in a direction close to the first housing, the pretension of the pretension member increases, the reeled-in portion of the flexible display assembly is released, and a portion of the flexible display assembly corresponding to a back of the display device slides to a front of the display device; and when the first housing and the second housing slide relatively along the first direction to reduce the area of the display device, the sliding assembly slides away from the first housing, the pretension of the pretension member is reduced, and the winding assembly winds the flexible display assembly.

In the display device of the present invention, the pretension member is an elastic member, and when the sliding assembly slides in the direction close to the first housing, elastic potential energy of the elastic member increases, and the reeled-in portion of the flexible display assembly is released; and when the sliding assembly slides away from the first housing, the elastic potential energy of the elastic member is reduced, and the winding assembly winds the flexible display assembly.

In the display device of the present invention, the pretension member is a magnetic member, the magnetic member comprises a first magnetic member and a second magnetic member, the first magnetic member is disposed on the sliding assembly, the second magnetic member is disposed on the second housing close to the first housing with respect to the first magnetic member, and a magnetic force is between the first magnetic member and the second magnetic member.

In the display device of the present invention, when the sliding assembly slides toward the first housing, a repulsive force between the first magnetic member and the second magnetic member increases, and the reeled-in portion of the flexible display assembly is released; and when the sliding assembly slides away from the first housing, the repulsive force between the first magnetic member and the second magnetic member decreases, and the winding assembly winds the flexible display assembly.

In the display device of the present invention, the sliding assembly and the second housing form a sealed cavity, or a sealed cavity is provided between the sliding assembly and the second housing, the sealed cavity is disposed on a side of the sliding assembly close to the first housing, and the sealed cavity is filled with gas or liquid.

In the display device of the present invention, when the sliding assembly slides toward the first housing, air pressure or hydraulic pressure in the sealed cavity increases, and the reeled-in portion of the flexible display assembly is released; and when the sliding assembly slides away from the first housing, the air pressure or hydraulic pressure in the sealed cavity decreases, and the winding assembly winds the flexible display assembly.

In the display device of the present invention, the flexible display assembly comprises a flexible display screen and a support layer supporting the flexible display screen, the support layer is disposed on a side of the flexible display assembly in contact with the winding assembly, and the flexible display screen is attached to the support layer.

In the display device of the present invention, a length of the support layer is greater than a length of the flexible display screen, an end of the support layer is connected to the first housing, and the other end of the support layer extends beyond the flexible display screen and is connected to the sliding assembly.

In the display device of the present invention, a limiting member is provided on the second housing, and the limiting member is used to fix the first housing and the second housing after the first housing and the second housing slide relative to a preset distance.

In the display device of the present invention, the limiting member comprises an electromagnetic member or a hook member.

Beneficial Effect

Beneficial effects of the present invention are: in a display device provided by the present invention, a sliding assembly and a pretension member are disposed on a second housing, the sliding assembly is connected to the second housing through the pretension member, and an end of a flexible display assembly is connected to the sliding assembly. When a first housing and the second housing slide relative to each other, a winding assembly reels in the flexible display assembly or pulls out a reeled-in portion of the flexible display assembly by sliding the sliding assembly. Since the pretension member comprises a pretension, the sliding assembly is configured to be slid by the pretension, so as to realize an automatic reeling of flexible display components, thereby meeting demands for automation and convenience of display devices in the future.

DESCRIPTION OF DRAWINGS

The technical solutions and other beneficial effects of the present invention will be apparent through detailed description of the specific implementation of the present invention in conjunction with drawings.

DETAILED DESCRIPTION OF PREFERRED EMBODIMENTS

Figure 1:
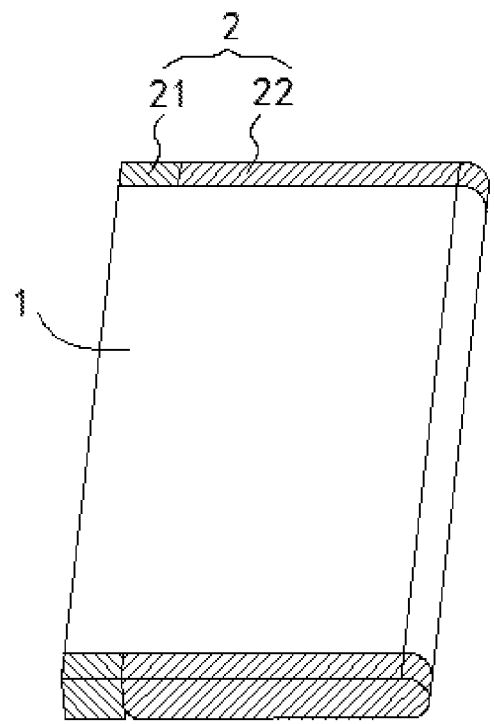
FIG. 1 is a schematic structural view of a front of a display device of the present invention in a small-size display state.

The technical solution in the embodiments of the present invention will be clearly and completely described below with reference to the accompanying drawings in the embodiments of the present invention. It is to be understood that the described embodiments are merely exemplary of the invention, and not restrictive of the full scope of the invention. All other embodiments, which can be obtained by a person skilled in the art without inventive step based on the embodiments of the present invention, are within the scope of the present invention.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise. In the present invention, "/" means "or."

The present invention may repeat reference numerals and/or reference letters in different examples. Such repetition is for purpose of simplicity and clarity and does not indicate a relationship between the various embodiments and/or settings discussed.

Figure 6:
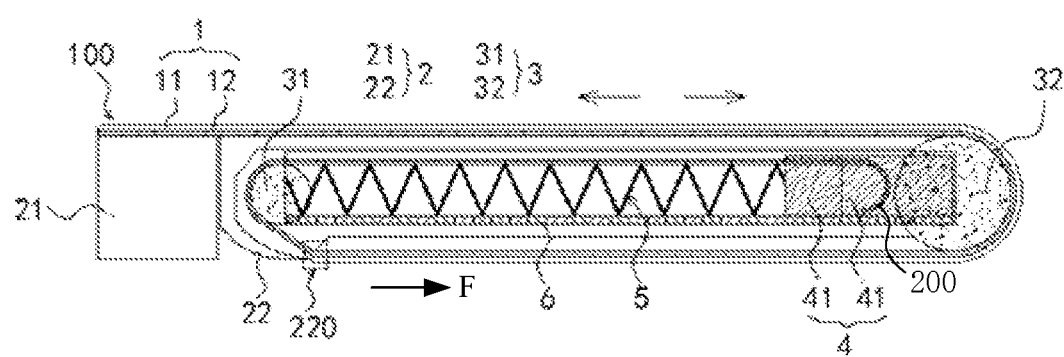
FIG. 6 is a schematic structural view of components of the display device in the small-size display state according to a first embodiment of the present invention.

Shown in FIG. 1 and FIG. 6 combined, a display device provided by the present invention comprises: a flexible display assembly 1 and a housing 2, and the flexible display assembly 1 is carried on the housing 2. The flexible display assembly 1 comprises a first end 100 and a second end 200 disposed opposite to each other. The housing 2 comprises a first housing 21 and a second housing 22 disposed opposite to each other. The first end 100 of the flexible display assembly 1 is connected to the first housing 21, the second end 200 is connected to the second housing 22, and the first housing 21 and the second housing 22 are configured to slide relative to each other along a first direction (as indicated by an arrow in the figure) to increase or decrease an area of the flexible display assembly 1 in an expanded state, thereby enabling the display device to switch between a small size and a large size.

The second housing 22 is provided with a winding assembly 3, a sliding assembly 4, and a pretension member 5. The second end 200 of the flexible display assembly 1 wound around the winding assembly 3 is connected to the sliding assembly 4, and the sliding assembly 4 is connected to the second housing 22 through the pretension member 5.

When the first housing 21 and the second housing 22 slide relative to each other, the winding assembly 3 reels in the flexible display assembly 1 or pulls out a reeled-in portion of the flexible display assembly 1 by sliding the sliding assembly 4. The pretension member 5 comprises a pretension E, and the sliding assembly 4 is configured to be slid along the first direction in the second housing 22 by the pretension E to reel in the flexible display assembly 1.

When the first housing 21 and the second housing 22 slide relative to each other along the first direction to increase an area of the display device, the sliding assembly 4 slides in a direction close to the first housing 21, the pretension E of the pretension member 5 increases, the reeled-in portion of the flexible display assembly 1 is released, and a portion of the flexible display assembly 1 corresponding to a back of the display device slides to a front of the display device. When an external force is removed, the sliding assembly 4 slides in a direction away from the first housing 21 under the pretension E of the pretension member 5, thereby driving the first housing 21 and the second housing 22 to slide to reduce a size of the display device. During this process, the pretension F of the pretension member 5 is reduced, and the winding assembly 3 reels the flexible display assembly 1. The present invention can realize an automatic reeling of flexible display components, thereby meeting demands for automation and convenience of display devices in the future.

The following describes the display device of the present invention in detail with reference to specific embodiments.

First Embodiment

Figure 2:
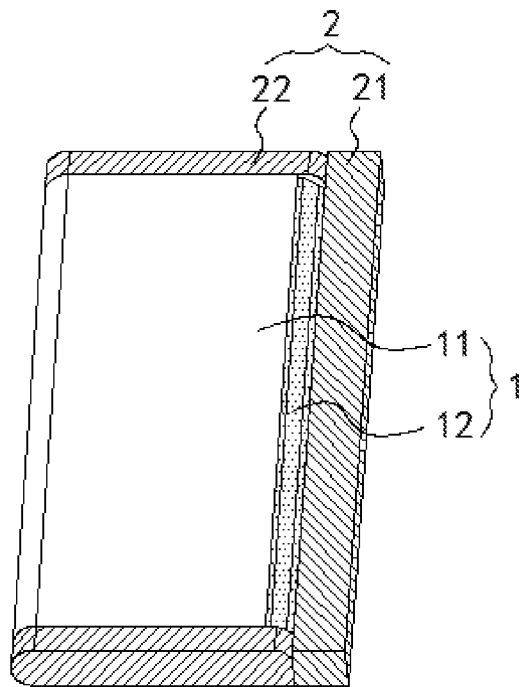
FIG. 2 is a schematic structural view of a back of the display device of the present invention in the small-size display state.

Shown in FIG. 1 and FIG. 2 are schematic structural views of a front and a back of the display device of the embodiment in a small-size display state. The first end 100 of the flexible display assembly 1 is connected to the first housing 21, and the second end 200 extends around a surface of the second housing 22 to an inside of the second housing 22. The flexible display assembly 1 comprises a flexible display screen 11 and a support layer 12 supporting the flexible display screen 11. The flexible display screen 11 is attached to a surface of the support layer 12 and is disposed on a side of the support layer 12 away from the housing 2. When the display device is in the small-size display state, the flexible display screen 11 is wound from a front to a back of the display device. At this time, the front of the display device is used for display, or both the front and back of the display device are used for display.

Figure 3:
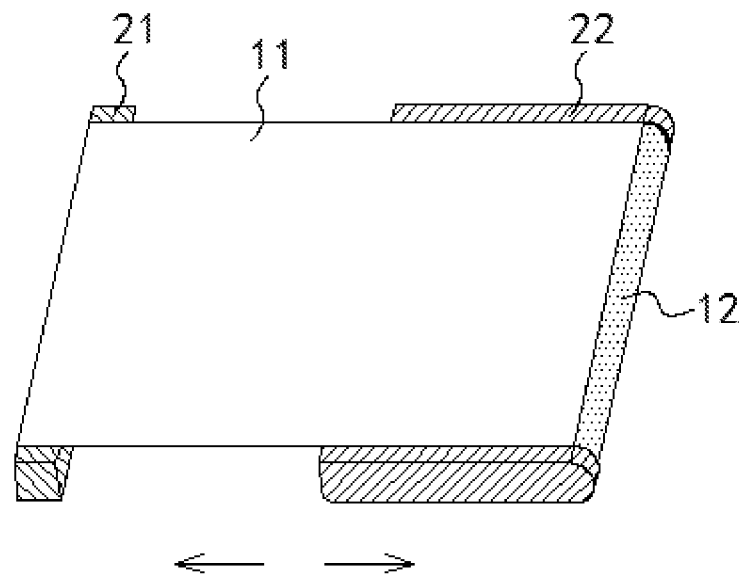
FIG. 3 is a schematic structural view of a front of the display device of the present invention in a large-size display state.
Figure 4:
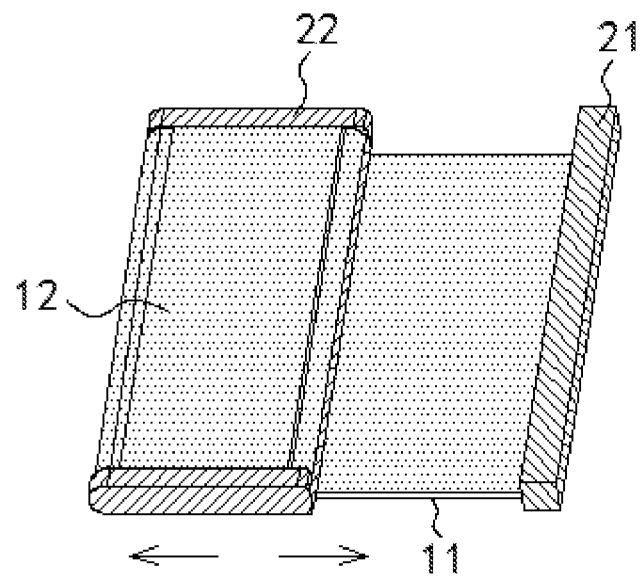
FIG. 4 is a schematic structural view of a back of the display device of the present invention in the large-size display state.

Shown in FIG. 3 and FIG. 4 are schematic structural view of a front and a back of the display device of the embodiment in a large-size display state. When the first housing 21 and the second housing 22 slide in a direction away from each other along the first direction, the area of a portion of the flexible display assembly 1 in the expanded state increases. That is, the display device is in the large-size display state. At this time, the flexible display assembly 1 on the back of the display device is pulled to the front of the display device, and the front of the display device is used for display.

Figure 5:
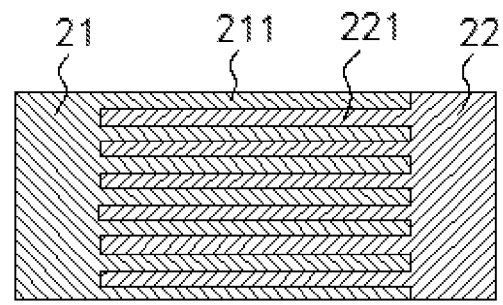
FIG. 5 is a partial schematic front view of a first housing and a second housing of the display device of the present invention.

Wherein, portions of the first housing 21 and the second housing 22 corresponding to the front of the display device comprise a comb-shaped structure. As shown in FIG. 5, a first comb-shaped structure 211 of the first housing 21 and a second comb-shaped structure 221 of the second housing 22 are disposed in a misaligned manner. The comb-shaped structures of the first housing 21 and the second housing 22 are engaged with or separated from each other, so as to realize relative sliding of the first housing 21 and the second housing 22. This is only an example, and is not limited to this. The display device of the present invention may also use other methods to realize the sliding of the first housing and the second housing.

Shown in FIG. 6 is a schematic structural view of components of the display device in the small-size display state according to the first embodiment of the present invention.

The winding assembly 3 is movably connected to the second housing 22 and comprises a first pulley 31 and a second pulley 32 respectively disposed at two ends of the second housing 22. Axial directions of the first pulley 31 and the second pulley 32 are parallel to the second housing 22 and perpendicular to the first direction. The first pulley 31 is disposed at an end of the second housing 22 close to the first housing 21, and the second pulley 32 is disposed at an end of the second housing 22 away from the first housing 21.

The second housing 22 is provided with a cavity, and the sliding assembly 4 and the pretension member 5 are disposed in the cavity. In the embodiment, the pretension member 5 is an elastic member, such as a spring, etc. An end of the elastic member is fixedly connected to the second housing 22, and an opposite end is fixed to the sliding assembly 4.

An inner surface of the cavity of the second housing 22 is provided with a sliding groove 6. An extending direction of the sliding groove 6 is consistent with the first direction, and the sliding assembly 4 is used to slide in the extending direction of the sliding groove 6. The sliding grooves 6 are oppositely disposed on both sides of the second housing 22, and the sliding assembly 4 is embedded in both of the sliding grooves 6.

The second housing 22 is further provided with an opening 220 communicating with the cavity. The second end 200 of the flexible display assembly 1 winds around the winding assembly 3 and extends into the cavity through the opening 220 and is fixedly connected to the sliding assembly 4.

A portion of the second pulley 32 is embedded in an end of the second housing 22, and a remaining portion of the second pulley 32 is exposed from a surface of the second housing 22 and is in contact with the flexible display assembly 1. The first pulley 31 is disposed in the cavity, and both ends are movably connected to the second housing 22. The flexible display assembly 1 extending into the cavity winds around the first pulley 31 and is fixedly connected to the sliding assembly 4.

A diameter of the second pulley 32 is less than or equal to a thickness of the housing 2. Further, the diameter of the second pulley 32 is equal to the thickness of the housing 2 to ensure flatness of the flexible display assembly 1 at an edge of the display device, so that it can smoothly transition. A diameter of the first pulley 31 is less than the diameter of the second pulley 32.

A length of the support layer 12 is greater than a length of the flexible display screen 11. An end of the support layer 12 is connected to the first housing 21, and another end of the support layer 12 extends beyond the flexible display screen 11 and is connected to the sliding assembly 4. Since the flexible display screen 11 is attached to the support layer 12, the force exerted on the support layer 12 by the flexible display assembly 1 during the entire process of the size change of the display device acts on the support layer 12, and thus the flexible display screen 11 is protected from being pulled by a large force to prevent failure.

Further, the reeled-in portion of the flexible display assembly 1 is a portion that extends from the support layer 12. Therefore, this avoids risk that the flexible display screen 11 is subject to bending stress for a long time, such as cracking.

Figure 7:
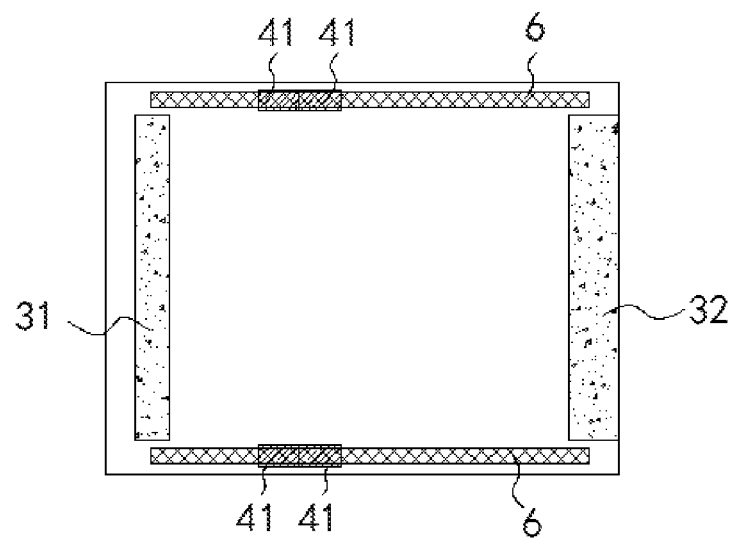
FIG. 7 is a schematic view of a positional relationship between a winding assembly and a sliding assembly in the display device of the present invention.

With reference to FIG. 7, in the embodiment, a length of the sliding groove 6 is greater than a distance between the first pulley 31 and the second pulley 32, but it is not limited to this. Since the first pulley 31 and the second pulley 32 are disposed between two sliding grooves 6, the pretension member 5 and the sliding assembly 4 will not affect rotation of the first pulley 31 and the second pulley 32.

The sliding assembly 4 at least comprises two sliding blocks 41 opposite to each other. The two sliding blocks 41 are disposed in the two sliding grooves 6 respectively, and the support layer 12 is fixedly connected to the two sliding blocks 41 opposite to each other.

In the embodiment, the sliding assembly 4 further comprises two sliding blocks 41 disposed in contact with each other along the sliding groove 6. The sliding block 41 close to the elastic member 5 is connected to the elastic member 5, and the sliding block 41 away from the elastic member 5 is fixedly connected to the support layer 12. In other embodiments, one of the sliding blocks 41 is correspondingly provided on one of the sliding grooves 6.

Figure 8:
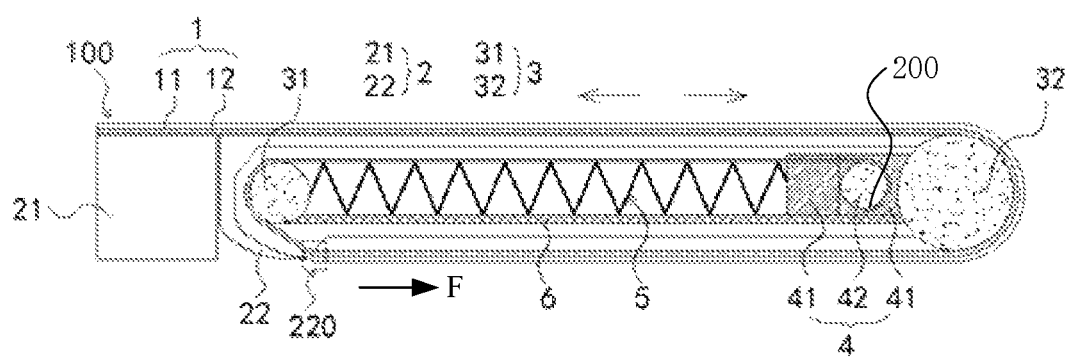
FIG. 8 is a schematic cross-sectional view of FIG. 6 perpendicular to an axial direction of the winding assembly.

Shown in combination with FIG. 8 is a schematic cross-sectional view of FIG. 6 perpendicular to an axial direction of the winding assembly. In the embodiment, the sliding assembly 4 further comprises a third pulley 42, and the third pulley 42 is disposed between the two sliding blocks 41 disposed opposite to each other. An axial direction of the third pulley 42 is parallel to the second housing 22 and perpendicular to the first direction, and both ends of the third pulley 42 are respectively fixed to the two sliding blocks 41 disposed opposite to each other. Specifically, the third pulley 42 is fixed to the sliding block 41 on a side away from the elastic member 5, and the third pulley 42 is used to fix the second end 200 of the flexible display assembly 1. The third pulley 42 moves with the sliding of the sliding assembly 4, and a diameter of the third pulley 42 is less than or equal to a height of the sliding block 41.

Of course, in other embodiments, the third pulley 42 may not be provided, and the second end 200 of the flexible display assembly 1 is directly fixed on the sliding assembly 4.

Figure 9:
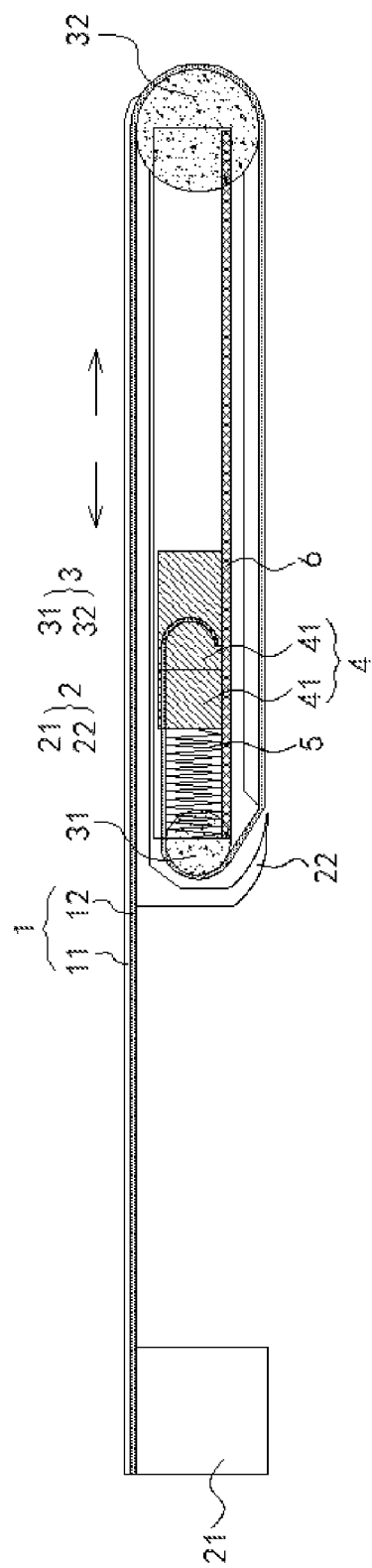
FIG. 9 is a schematic structural view of the components of the display device in the large-size display state according to the first embodiment of the present invention.

Please refer to FIG. 6 and FIG. 9, a sliding direction of the sliding assembly 4 is consistent with a sliding direction of the first housing 21. When the first housing 21 and the second housing 22 slide relative to each other in the first direction to switch the display device to a small-size display, the sliding assembly 4 slides away from the first housing 21. An elastic stress of the elastic member 5 is released, elastic potential energy is reduced, and the winding assembly 3 reels the flexible display assembly 1. When the display device is completely switched to the small size display, an end of the sliding assembly 4 away from the elastic member 5 is in contact with the second housing 22. At this time, the elastic member 5 still has compression deformation. The pretension E of the elastic member 5 can make the flexible display assembly 1 to be pretensioned and straighten, maintaining the flatness of the flexible display assembly 1.

When the first housing 21 and the second housing 22 slide relative to each other in the first direction to switch the display device to a large-size display, a portion of the support layer 12 in the cavity is pulled out to the back of the display device. The second end 200 of the flexible display assembly 1 drives the sliding assembly 4 to slide in a direction (to the left) close to the first housing 21. The elastic member 5 is compressed, the elastic potential energy increases, the reeled-in portion of the flexible display assembly 1 is released, and the deformation amount of the elastic member 5 increases. During the process, the elastic member 5 has been providing tension, so the flexible display assembly 1 has been in a stretched state. When the external force is unloaded, the pretension F of the elastic member 5 can push the sliding assembly 4 to slide to the right, so that the flexible display assembly 1 is reeled back to the small-size state. It is understandable that recovery of the elastic member from the compressed state to the original state after removing the external force is a spontaneous process without the external force, so as to realize the automatic winding of the flexible display assembly, thereby meeting the demands for the automation and the convenience of the display devices in the future.

In the above-mentioned dimensional change of the display device, a length of the flexible display assembly 1 that is reeled in or pulled out by the winding assembly 3 is equal to a sliding distance of the sliding assembly 4 relative to the second housing 22, and is equal to a relative sliding distance between the first housing 21 and the second housing 22.

In the embodiment, a limiting member (not shown) is provided on the second housing 22. The limiting member is used to fix the first housing 21 and the second housing 22 after the first housing 21 and the second housing 22 slide relative to a preset distance.

For example, the limiting member is an electromagnetic member or a hook member. Specifically, a member such as a mechanical hook or an electromagnet may be provided inside the second housing 22, so that when the first housing 21 and the second housing 22 are pulled to the farthest distance, that is, in the large-size display state, the sliding block 41 connected to the flexible display assembly 1 is caught by the hook or attracted by the electromagnet, and the display device can maintain the large-sized display state shown in FIG. 8 when the external force is unloaded. A button (not shown) is provided on the second housing 22. When the button is pressed, the mechanical hook is unhooked or the electromagnet is powered off to lose magnetic force. The sliding assembly 4 can slide to the right under the thrust of the elastic member 5 to return the display device to the small-sized display state shown in FIG. 6.

Second Embodiment

Figure 10:
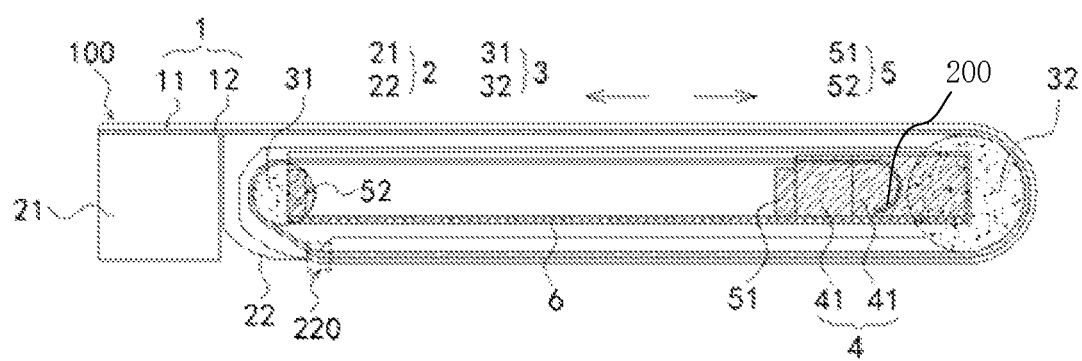
FIG. 10 is a schematic structural view of the components of the display device in the small-size display state according to a second embodiment of the present invention.
Figure 11:
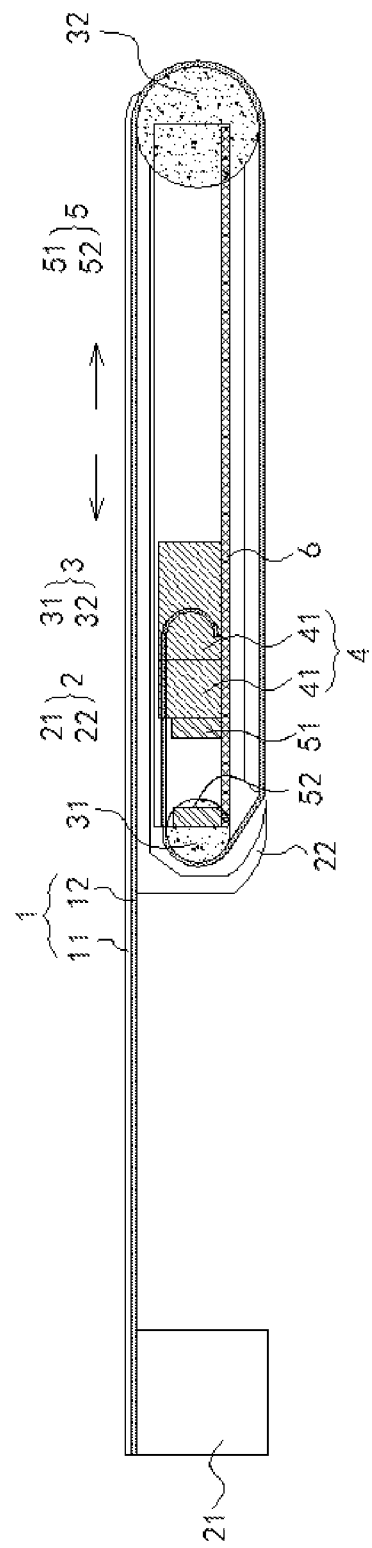
FIG. 11 is a schematic structural view of the components of the display device in the large-size display state according to the second embodiment of the present invention.

As shown in FIG. 10 and FIG. 11, the display device provided by the embodiment is same as/similar to the display device provided by the above first embodiment, and a difference is only in that: the pretension member in the embodiment is a magnetic member 5, and the magnetic member 5 comprises a first magnetic member 51 and a second magnetic member 52. The first magnetic member 51 is disposed on the sliding assembly 4, and the second magnetic member 52 is relatively disposed on the second housing 22 on a side of the first magnetic member 51 close to the first housing 21. There is a magnetic force between the first magnetic member 51 and the second magnetic member 52. In addition to the above distinguishing features, for remaining structural features of the display device of the embodiment, please refer to the description in the above first embodiment, and no more details are provided here.

Specifically, when the first housing 21 and the second housing 22 slide relative to each other along the first direction to switch the display device to the large-size display, the portion of the support layer 12 in the cavity is pulled out to the back of the display device. The second end 200 of the flexible display assembly 1 drives the sliding assembly 4 to slide in the direction (to the left) close to the first housing 21. The first magnetic member 51 and the second magnetic member 52 are close to each other and a repulsive force between the two increases, and the reeled-in portion of the flexible display assembly 1 is released. During the process, the elastic member 5 has been providing tension, so the flexible display assembly 1 has been in the stretched state.

When the display device is stretched to the large-size display, the limiting member is opened to fix the first housing 21 and the second housing 22 to maintain the display device in the large-size display. When the display device is switched to the small-size display, the limiting member is disconnected. After unloading the external force, the repulsion of the magnetic member 5 can push the sliding assembly 4 to slide to the right, so that the flexible display assembly 1 is reeled to the small-size state. During the process, the repulsive force between the first magnetic member 51 and the second magnetic member 52 decreases. It can be understood that, after removing the external force, reducing the repulsive force (that is, to return to an initial state) by increasing the distance between the first magnetic member 51 and the second magnetic member 52 is a spontaneous process without the external force, so as to realize the automatic winding of the flexible display assembly, thereby meeting the demands for the automation and the convenience of the display devices in the future.

When the display device is completely switched to the small-size display, an end of the sliding assembly 4 away from the magnetic member 5 is in contact with the second housing 22. At this time, the repulsion between the first magnetic member 51 and the second magnetic member 52 can cause the flexible display assembly 1 to be stretched by the repulsion and maintain the flatness of the flexible display assembly 1.

Wherein, the magnetic member 5 may also be an electromagnetic structure, which is not limited here.

Third Embodiment

Figure 12:
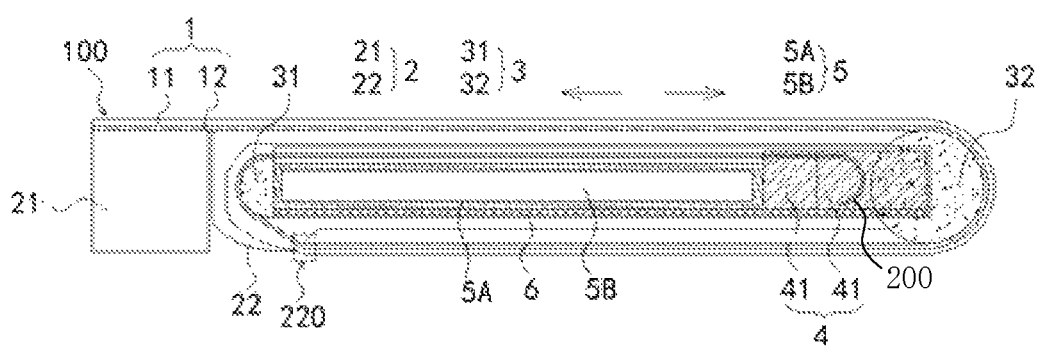
FIG. 12 is a schematic structural view of the components of the display device in the small-size display state according to a third embodiment of the present invention.
Figure 13:
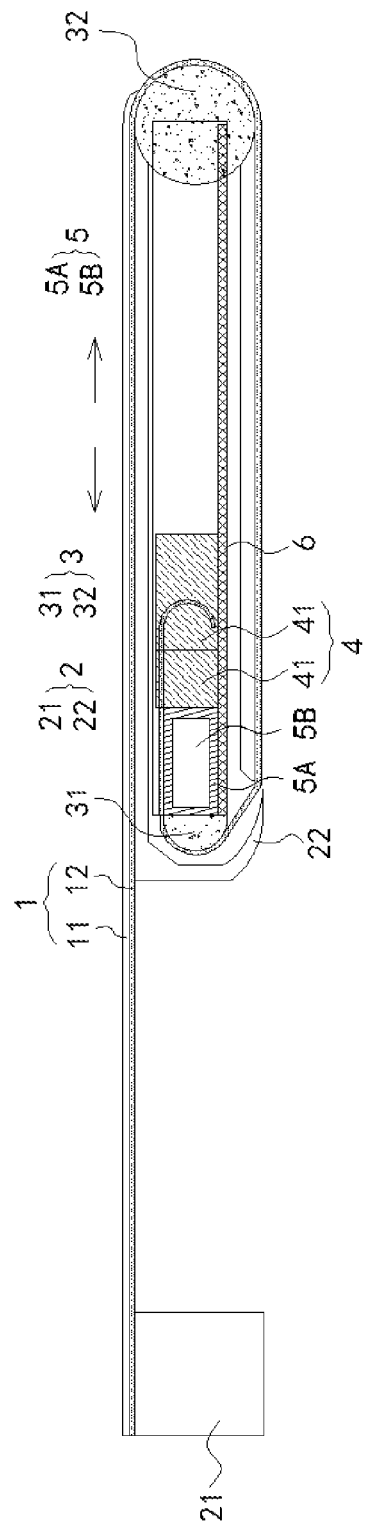
FIG. 13 is a schematic structural view of the components of the display device in the large-size display state according to the third embodiment of the present invention.

As shown in FIG. 12 and FIG. 13, the display device provided by the embodiment is same as/similar to the display device provided by the above first embodiment, and a difference is only in that: in the embodiment, the sliding assembly 4 and the second housing 22 form a sealed cavity 5A, or the sealed cavity 5A is provided between the sliding assembly 4 and the second housing 22. The sealed cavity 5A is positioned on a side of the sliding assembly 4 close to the first housing 21. A volume of the sealed cavity 5A changes with the sliding of the sliding assembly 4. For example, when the sliding assembly 4 slides to the left, the volume of the sealed cavity 5A decreases; when the sliding assembly 4 slides to the right, the volume of the sealed cavity 5A increases. The embodiment will be described by taking an example in which the sealed cavity 5A is provided between the sliding assembly 4 and the second housing 22. The sealed cavity 5A is filled with a liquid 5B, and the pretension member 5 of the first embodiment is replaced by the sealed cavity 5A and the liquid 5B.

Specifically, when the first housing 21 and the second housing 22 slide relative to each other in the first direction to switch the display device to the large-size display, the portion of the support layer 12 in the cavity is pulled out to the back of the display device. The second end 200 of the flexible display assembly 1 drives the sliding assembly 4 to slide in the direction (to the left) close to the first housing 21. The liquid 5B in the sealed cavity 5A is compressed, hydraulic pressure is increased, and the reeled-in portion of the flexible display assembly 1 is released. During the process, the flexible display assembly 1 has been in the stretched state.

When the display device is stretched to the large-size display, the limiting member is opened to fix the first housing 21 and the second housing 22 to maintain the display device in the large-size display. When the display device is switched to the small-size display, the limiting member is disconnected. After unloading the external force, the compressed liquid 5B returns to its initial state from the compressed state and can push the sliding assembly 4 to slide to the right, so that the flexible display assembly 1 is reeled to the small-size state. During the process, a volume of the sealed cavity 5A increases, and the hydraulic pressure of the liquid 5B decreases. It can be understood that, after removing the external force, the compressed liquid 5B changes in the direction of the hydraulic pressure reduction (that is, to return to an initial state) is a spontaneous process without the external force, so as to realize the automatic winding of the flexible display assembly, thereby meeting the demands for the automation and the convenience of the display devices in the future.

When the display device is completely switched to the small-size display, an end of the sliding assembly 4 away from the sealed cavity 5A is in contact with the second housing 22. At this time, the sealed cavity 5A can cause the flexible display assembly 1 to be stretched and maintain the flatness of the flexible display assembly 1.

Fourth Embodiment

The display device provided in the embodiment is same as/similar to the display device provided in the third embodiment. Refer to FIG. 12 and FIG. 13, a difference is only in that: in the embodiment, the sealed cavity 5A is filled with a gas, and the pretension member 5 in the first embodiment is replaced by the sealed cavity 5A and the gas.

Specifically, when the first housing 21 and the second housing 22 slide relative to each other in the first direction to switch the display device to the large-size display, the portion of the support layer 12 in the cavity is pulled out to the back of the display device. The second end 200 of the flexible display assembly 1 drives the sliding assembly 4 to slide in the direction (to the left) close to the first housing 21. The gas in the sealed cavity 5A is compressed, air pressure is increased, and the reeled-in portion of the flexible display assembly 1 is released. During the process, the flexible display assembly 1 has been in the stretched state.

After disconnecting the limiting member and unloading the external force, the compressed gas returns to its initial state from the compressed state and can push the sliding assembly 4 to slide to the right, so that the flexible display assembly 1 is reeled to the small-size state. During the process, a volume of the sealed cavity 5A increases, and gas pressure of the gas decreases. It can be understood that, after removing the external force, the compressed gas changes in the direction of the gas pressure reduction (that is, to return to an initial state) is a spontaneous process without the external force, so as to realize the automatic winding of the flexible display assembly, thereby meeting the demands for the automation and the convenience of the display devices in the future.

When the display device is completely switched to the small-size display, an end of the sliding assembly 4 away from the sealed cavity 5A is in contact with the second housing 22. At this time, the sealed cavity 5A can cause the flexible display assembly 1 to be stretched by the pretension and maintain the flatness of the flexible display assembly 1.

In the present invention, by providing the sliding assembly and the pretension member on the second housing, the sliding assembly is connected to the second housing through the pretension member, and the end of the flexible display assembly is connected to the sliding assembly. When the first housing and the second housing slide relative to each other, the winding assembly reels in the flexible display assembly or pulls out the reeled-in portion of the flexible display assembly by sliding the sliding assembly. Since the pretension member comprises the pretension, the sliding assembly is configured to be slid by the pretension, so as to realize the automatic winding of flexible display components, thereby meeting the demands for the automation and the convenience of the display devices to reel in the flexible display assembly in the future.

In summary, although the present invention has been disclosed as above with preferred embodiments, the above preferred embodiments are not intended to limit the present invention. Those of ordinary skill in the art can make various changes and modifications without departing from the spirit and scope of the present invention, so the protection scope of the present invention is subject to the scope defined by the claims.

What is claimed is:

1. A display device, comprising:
    a flexible display assembly comprising a first end and a second end disposed opposite to each other; and
    a housing, wherein the flexible display assembly is carried on the housing, the housing comprises a first housing and a second housing disposed opposite to each other, the first end of the flexible display assembly is connected to the first housing, the second end is connected to the second housing, and the first housing and the second housing are configured to slide relative to each other along a first direction to increase or decrease an area of the flexible display assembly in an expanded state;
    wherein the second housing is provided with a winding assembly, a sliding assembly, and a pretension member, the second end of the flexible display assembly wound around the winding assembly is connected to the sliding assembly, and the sliding assembly is connected to the second housing through the pretension member;
    wherein when the first housing and the second housing slide relative to each other, the winding assembly reels in the flexible display assembly or pulls out a reeled-in portion of the flexible display assembly by sliding the sliding assembly, the pretension member is an elastic member, and the sliding assembly is configured to be slid along the first direction in the second housing to reel in the flexible display assembly; and
    wherein the sliding assembly comprises two sliding blocks disposed opposite to each other and a pulley disposed between the two sliding blocks, one of the two sliding blocks close to the pretension member is connected to the pretension member, and another one of the two sliding blocks away from the pretension member is connected to the pulley.

2. The display device as claimed in claim 1, wherein a length of the flexible display assembly that is reeled in or pulled out by the winding assembly is equal to a sliding distance of the sliding assembly relative to the second housing, and is equal to a relative sliding distance between the first housing and the second housing.

3. The display device as claimed in claim 1, wherein a sliding direction of the sliding assembly is same as a sliding direction of the first housing.

4. The display device as claimed in claim 1, wherein the winding assembly comprises a first pulley and a second pulley disposed at two ends of the second housing, the first pulley and the second pulley are located on both sides of the two sliding blocks, respectively; axial directions of the first pulley and the second pulley are parallel to the second housing and perpendicular to the first direction, the first pulley is disposed at an end of the second housing close to the first housing, and the second pulley is disposed at an end of the second housing away from the first housing.

5. The display device as claimed in claim 4, wherein a diameter of the second pulley is less than or equal to a thickness of the housing, and a diameter of the first pulley is less than the diameter of the second pulley.

6. The display device as claimed in claim 4, wherein a portion of the second pulley is embedded in an end of the second housing, and a remaining portion of the second pulley is exposed from a surface of the second housing and is in contact with the flexible display assembly.

7. The display device as claimed in claim 1, wherein the second housing is provided with a cavity, the sliding assembly and the pretension member are disposed in the cavity, the second housing is further provided with an opening communicating with the cavity, and the second end of the flexible display assembly extends into the cavity through the opening and is connected to the sliding assembly.

8. The display device as claimed in claim 7, wherein an inner surface of the second housing is provided with a sliding groove, an extending direction of the sliding groove is consistent with the first direction, and the sliding assembly is used to slide in the extending direction of the sliding groove.

9. The display device as claimed in claim 8, wherein an axial direction of the pulley is parallel to the second housing and perpendicular to the first direction, two ends of the pulley are respectively fixed to the two sliding blocks disposed opposite to each other, and the second end of the flexible display assembly is connected to the pulley.

10. The display device as claimed in claim 9, wherein the two sliding blocks are disposed along the sliding groove and in contact with each other.

11. The display device as claimed in claim 7, wherein when the first housing and the second housing slide relative to each other along the first direction to increase an area of the display device, the sliding assembly slides in a direction close to the first housing, the reeled-in portion of the flexible display assembly is released, and a portion of the flexible display assembly corresponding to a back of the display device slides to a front of the display device; and when the first housing and the second housing slide relatively along the first direction to reduce the area of the display device, the sliding assembly slides away from the first housing, and the winding assembly winds the flexible display assembly.

12. The display device as claimed in claim 11, wherein when the sliding assembly slides in the direction close to the first housing, an elastic potential energy of the elastic member increases, and the reeled-in portion of the flexible display assembly is released; and when the sliding assembly slides away from the first housing, the elastic potential energy of the elastic member is reduced, and the winding assembly winds the flexible display assembly.

13. The display device as claimed in claim 1, wherein the flexible display assembly comprises a flexible display screen and a support layer supporting the flexible display screen, the support layer is disposed on a side of the flexible display assembly in contact with the winding assembly, and the flexible display screen is attached to the support layer.

14. The display device as claimed in claim 13, wherein a length of the support layer is greater than a length of the flexible display screen, an end of the support layer is connected to the first housing, and the other end of the support layer extends beyond the flexible display screen and is connected to the sliding assembly.

15. The display device as claimed in claim 1, wherein the elastic member is a spring.

16. A display device, comprising:
a flexible display assembly comprising a first end and a second end disposed opposite to each other; and
a housing, wherein the flexible display assembly is carried on the housing, the housing comprises a first housing and a second housing disposed opposite to each other, the first end of the flexible display assembly is connected to the first housing, the second end is connected to the second housing, and the first housing and the second housing are configured to slide relative to each other along a first direction to increase or decrease an area of the flexible display assembly in an expanded state;
wherein the second housing is provided with a winding assembly, a sliding assembly, and a magnetic member, the second end of the flexible display assembly wound around the winding assembly is connected to the sliding assembly, and the sliding assembly is connected to the second housing through the magnetic member;
wherein when the first housing and the second housing slide relative to each other, the winding assembly reels in the flexible display assembly or pulls out a reeled-in portion of the flexible display assembly by sliding the sliding assembly;
wherein the magnetic member comprises a first magnetic member and a second magnetic member, the first magnetic member is disposed on the sliding assembly, the second magnetic member is disposed on the second housing close to the first housing with respect to the first magnetic member, a magnetic force is between the first magnetic member and the second magnetic member, and the sliding assembly is configured to slide along the first direction in the second housing by the magnetic force to reel in the flexible display assembly; and
wherein the sliding assembly comprises two sliding blocks disposed opposite to each other and a pulley disposed between the two sliding blocks, one of the two sliding blocks close to the magnetic member is connected to the magnetic member, and another one of the two sliding blocks away from the magnetic member is connected to the pulley.

17. The display device as claimed in claim 16, wherein when the sliding assembly slides toward the first housing, a repulsive force between the first magnetic member and the second magnetic member increases, and the reeled-in portion of the flexible display assembly is released; and when the sliding assembly slides away from the first housing, the repulsive force between the first magnetic member and the second magnetic member decreases, and the winding assembly winds the flexible display assembly.

18. A display device, comprising:
a flexible display assembly comprising a first end and a second end disposed opposite to each other; and
a housing, wherein the flexible display assembly is carried on the housing, the housing comprises a first housing and a second housing disposed opposite to each other, the first end of the flexible display assembly is connected to the first housing, the second end is connected to the second housing, and the first housing and the second housing are configured to slide relative to each other along a first direction to increase or decrease an area of the flexible display assembly in an expanded state;

wherein the second housing is provided with a winding assembly and a sliding assembly, the second end of the flexible display assembly wound around the winding assembly is connected to the sliding assembly, and the sliding assembly is connected to the second housing;

wherein when the first housing and the second housing slide relative to each other, the winding assembly reels in the flexible display assembly or pulls out a reeled-in portion of the flexible display assembly by sliding the sliding assembly, and the sliding assembly is configured to slide along the first direction in the second housing to reel in the flexible display assembly;

wherein the sliding assembly and the second housing form a sealed cavity, or a sealed cavity is provided between the sliding assembly and the second housing, the sealed cavity is disposed on a side of the sliding assembly close to the first housing, the sealed cavity is filled with gas or liquid, and a volume of the sealed cavity changes with the sliding of the sliding assembly; and wherein the sliding assembly comprises two sliding blocks disposed opposite to each other and a pulley disposed between the two sliding blocks, one of the two sliding blocks is close to the sealed cavity, and another one of the two sliding blocks away from the sealed cavity is connected to the pulley.

19. The display device as claimed in claim 18, wherein when the sliding assembly slides toward the first housing, air pressure or hydraulic pressure in the sealed cavity increases, and the reeled-in portion of the flexible display assembly is released; and when the sliding assembly slides away from the first housing, the air pressure or hydraulic pressure in the sealed cavity decreases, and the winding assembly winds the flexible display assembly.

\* \* \* \* \*